United States Patent
Cordle et al.

(10) Patent No.: US 8,453,674 B2
(45) Date of Patent: Jun. 4, 2013

(54) VALVE FAULT INDICATION AND CONTROL

(75) Inventors: Kevin Gerard Cordle, Miller Place, NY (US); John Behm, Syosset, NY (US)

(73) Assignee: Target Rock Division of Curtiss-Wright FLow Control Corporation, East Farmingdale, NY (US)

(*) Notice: Subject to any disclaimer, the term of this patent is extended or adjusted under 35 U.S.C. 154(b) by 627 days.

(21) Appl. No.: 12/723,310

(22) Filed: Mar. 12, 2010

(65) Prior Publication Data

US 2011/0220206 A1 Sep. 15, 2011

(51) Int. Cl.
*F16K 37/00* (2006.01)

(52) U.S. Cl.
USPC ...... 137/554; 137/551; 137/552; 251/129.04; 340/527; 340/686.1; 361/160

(58) Field of Classification Search
USPC ...... 137/551, 552, 554; 251/129.04; 340/540, 340/527, 686.1; 73/168; 361/160
See application file for complete search history.

(56) References Cited

U.S. PATENT DOCUMENTS

| | | | | |
|---|---|---|---|---|
| 3,829,848 A * | 8/1974 | Eickelberg et al. | ............ | 700/128 |
| 4,376,450 A | 3/1983 | Fayfield et al. | | |
| 4,575,718 A * | 3/1986 | Ludowyk | ...................... | 340/3.71 |
| 4,870,364 A * | 9/1989 | Trox et al. | ...................... | 324/418 |
| 5,109,675 A | 5/1992 | Hwang | | |
| 5,422,808 A | 6/1995 | Catanese, Jr. et al. | | |
| 5,471,198 A * | 11/1995 | Newham | ...................... | 340/573.4 |
| 5,524,484 A | 6/1996 | Sullivan | | |
| 5,889,405 A * | 3/1999 | Yanai et al. | ...................... | 324/522 |
| 5,917,691 A * | 6/1999 | Kadah | ............... | 361/154 |
| 6,057,771 A * | 5/2000 | Lakra | ............... | 340/611 |
| 6,131,609 A | 10/2000 | Metso et al. | | |
| 7,089,086 B2 * | 8/2006 | Schoonover | ............... | 700/275 |
| 7,405,917 B2 | 7/2008 | Ahrens et al. | | |
| 7,540,572 B2 | 6/2009 | Nakamura | | |
| 7,694,936 B2 * | 4/2010 | Hoffmann et al. | ....... | 251/129.04 |
| 2002/0139180 A1 * | 10/2002 | Xiong et al. | ................. | 73/118.1 |
| 2003/0189492 A1 * | 10/2003 | Harvie | ...................... | 340/573.1 |
| 2004/0004483 A1 * | 1/2004 | Hazelton | ...................... | 324/522 |
| 2004/0059496 A1 * | 3/2004 | Pursifull et al. | ............... | 701/114 |
| 2004/0158419 A1 * | 8/2004 | Pearson et al. | ................ | 702/64 |
| 2004/0211928 A1 | 10/2004 | Coura et al. | | |
| 2006/0138282 A1 * | 6/2006 | Pilkington et al. | ........ | 244/135 R |
| 2006/0220844 A1 | 10/2006 | Flanders | | |
| 2007/0291438 A1 * | 12/2007 | Ahrens et al. | ................. | 361/160 |
| 2009/0121868 A1 * | 5/2009 | Flanders | ...................... | 340/540 |
| 2009/0174981 A1 * | 7/2009 | Mallon et al. | ................. | 361/114 |
| 2010/0037957 A1 * | 2/2010 | Tabelander et al. | ............... | 137/1 |
| 2010/0188229 A1 * | 7/2010 | Nhep | ...................... | 340/573.1 |
| 2010/0295677 A1 * | 11/2010 | Egawa et al. | ................. | 340/540 |
| 2012/0056711 A1 * | 3/2012 | Hanrahan et al. | ............... | 340/3.4 |

* cited by examiner

*Primary Examiner* — John Rivell
*Assistant Examiner* — Minh Le
(74) *Attorney, Agent, or Firm* — Hoffmann & Baron, LLP

(57) ABSTRACT

According to aspects described herein, there is disclosed a method of and system for indicating a fault associated with a fluid valve moveable between an open and a closed operative position. The method and system compare a valve state indicator to a valve last command, wherein the valve state indicator represents a detected operative position of the valve and the valve last command being an operative command sent to the fluid valve. The method and system also initiate a fault indication after a predetermined time delay relative to the valve last command being sent and when the valve state indicator does not match the valve last command. After the time delay a fault indication can be initiated immediately upon receipt of a different valve state indicator.

18 Claims, 2 Drawing Sheets

VALVE FAULT INDICATION AND CONTROL

TECHNICAL FIELD

The presently disclosed technologies are directed to systems and methods used to indicate faults and control valves. The systems and methods described herein are suited to solenoid operated control valves, particularly in critical safety control systems.

BACKGROUND

A solenoid valve involves the use of a magnetic movable core which is mechanically linked to a valve closure element. The movable core is typically housed in a cylinder or other housing adjacent to a closure element. Typically, an electromagnetic field is produced by an electric coil to control the movement of the movable core to move the closure element between open and closed positions. Typically, the magnetic coil is energized or de-energized to move the core to in-turn move the closure element to either an open position when the coil is energized, allowing fluid to flow through the valve, or a closed position when de-energized preventing or restricting fluid flow. Because the movement of the valve elements is happening inside a closed system, it is often desirable to verify the operational state of the valve. If the valve is not in or does not move toward the desired operational position it is said to be in fault. Contemporary fault detection systems are designed to quickly and immediately indicate a fault based on an instantaneous comparison of changes in pressure, electrical current or positional indicators from the valve.

Accordingly, it would be desirable to provide a method, system and apparatus capable of indicating a fault based indicators from the valve yet allowing a delay for the valve to react to commands, and overcomes other shortcoming of the prior art.

SUMMARY

According to aspects described herein, there is disclosed a method of and system for indicating a fault associated with a fluid valve moveable between an open and a closed operative position. The method including comparing a valve state indicator to a valve last command, wherein the valve state indicator represents a detected operative position of the valve and the valve last command being an operative command sent to the fluid valve. The method also including initiating a fault indication after a predetermined time delay relative to the valve last command being sent and when the valve state indicator does not match the valve last command.

Additionally, the valve last command can be a most recent operative command sent to the fluid valve. The predetermined time delay can be at least one minute in duration. Also, the predetermined time delay can be adjustable. The fault indication can be initiated only if during the predetermined time delay there is no change in the valve state indicator. Additionally, the fault indication can include removing all power from a valve controller. Alternatively, where the fluid valve is a solenoid operating valve, the fault indication can remove power to at least a portion of the solenoid operating valve. Further, the fault indication can include initiating a visual signal identifying the type of fault that has occurred. The visual signal can come from one or more flashing lights. Also, the fault indication can be transmitted to an indicator on a valve circuit in the valve, a portion of the valve body and/or a remote location to the valve. Also, the fault indication can identify a failure to open, failure to close, mechanical open or mechanical close fault associated with the valve. After the time delay a fault indication can be initiated immediately upon receipt of a different valve state indicator.

In accordance with another aspect of the disclosed technologies, there is disclosed herein a fluid valve fault indication system. The system includes a valve state indicator, a valve last command indicator and a fault indication controller. The valve state indicator detects at least one of an open operative position and a closed operative position of a fluid valve. The valve last command indicator identifies a last operative command sent to the fluid valve. The last operative command including an open or a close command. The fault indication controller is operatively coupled to the valve state indicator and the valve last command indicator. Also, the fault indication controller initiating a fault indication after a predetermined time delay relative to the valve last command being sent and when the valve state indicator does not match the valve last command.

Further, the valve last command can be a most recent operative command sent to the fluid valve. The predetermined time delay can be approximately one minute in duration. Also, the fault indication can include removing all power from the fluid valve. Additionally, the fault indication can include initiating a visual signal identifying the type of fault that has occurred. Further, the fault indication can be initiated immediately upon detection of a change in the fluid valve operative position. The fault indication can also be subsequently terminated upon detection of a change in the fluid valve operative position. The fault indication can be transmitted to an indicator on at least one of a valve circuit in the valve, a portion of the valve body and a remote location to the valve. Also, the fault indication can be transmitted to all three of the valve circuit, valve body and remote location. The fault indication can identify a failure to open, failure to close, mechanical open or mechanical close fault associated with the valve.

These and other aspects, objectives, features, and advantages of the disclosed technologies will become apparent from the following detailed description of illustrative embodiments thereof, which is to be read in connection with the accompanying drawings.

DETAILED DESCRIPTION

Describing now in further detail these exemplary embodiments with reference to the Figures, as described above a valve fault indication and control system and method is disclosed. It should be understood that while only a portion of exemplary systems and methods are illustrated herein, such systems and methods would naturally be incorporated into existing valve assemblies and control system, in accordance with the disclosure herein.

In accordance with aspects of the disclosed technologies, a method of and system for controlling a fluid valve moveable between an open and a closed operative position is disclosed.

The method and system employ fault indication detection for when a solenoid operating valve is in an Open or Closed position, contrary to the last external position command indicated for the valve. When such a contrary state is detected, steps are taken to indicate a faulted condition and preferable deactivate or shutdown the valve. The method and system have particular application to solenoid operating valves or other valves whose continued malfunctioning operation could potentially cause a hazard, such as a fire or explosion.

Figure 1:
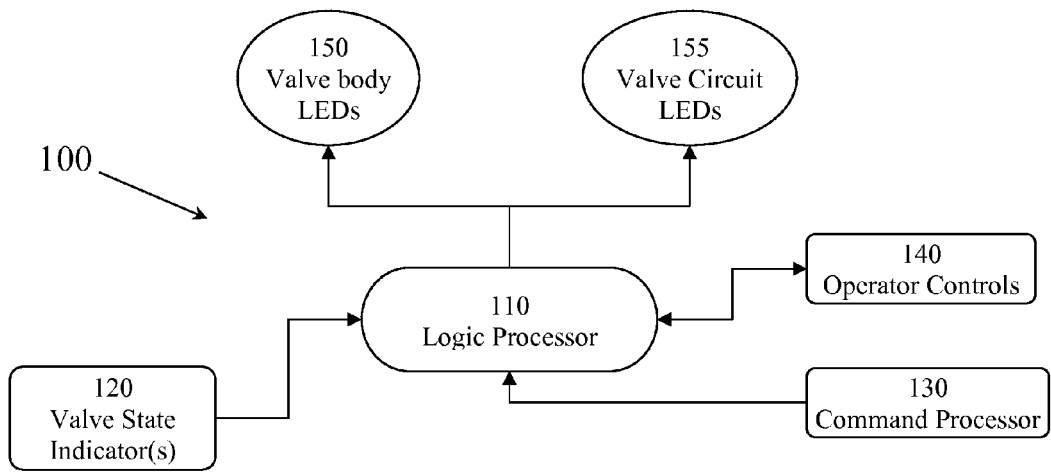
FIG. 1 shows a schematic representation of an exemplary valve fault indication system in accordance with an aspect of the disclosed technologies.

FIG. 1 shows a schematic representation of a valve control system 100 in accordance with an aspect of the disclosed technologies. The system 100 includes a logic processor 110 that can receive input signals from one or more valve sensors 120, a command processor 130 or operator controls 140. Also, the logic processor 110 can transmit output signals to the operator controls 140 as well as indicators 150, 155.

The logic processor 110 can include one or more processing devices capable of individually or collectively receiving signals from input devices, outputting signals to indication and control devices and processing those signals in accordance with a rules-based set of instructions. For example, the logic processor 110 can be a circuit board, computer or other processing device. In response to received signals, the logic processor 110 can then transmit signals to one or more indication and control devices as appropriate.

The valve state indicator 120 is generated and/or transmitted from one or more devices that can measure or detect the current physical state of the valve (at least being able to indicate open versus closed). Examples of some valve sensors that can output a valve state indicator include optical sensor arrays such as a Phototransistor Optical Interrupter Switch. The output of such a device functions as an electronic signal or "flag" indicating the state of the valve.

The command processor 130 represents a digital logic circuit comprised of CMOS gates, which taken together form and perform a logic function. The command processor 130 will output one or more values that represent the last command instruction given to the valve (also referred to herein as a "valve last command" or VLC). The VLC represents instructions input to the valve command processor for the valve to either Open or Close. Thus, the VLC represents either an Open or Close command.

The operator controls 140 represents a master control station that is typically remote from the valve body. The operator controls 140 can be a computer or other electronic control device operatively coupled to the valve, either directly or through a network. Such controls 140 could be accessed and used by a system administrator, technician or maintenance personnel. The functional characteristics of the valve are controlled from a master control station (also referred to herein as the "operator controls") by command signals being sent from the operator controls 140 via input control lines to the valve. One input line can be used for the valve OPEN command and another input line can be used for the valve CLOSE command input. The signal to either valve command input line can be a short burst signal of 115VAC (nominal), which can be generated at the operator controls to be sent to the remotely located valve.

The indicators 150, 155 are visual indicators. For example, valve body indicators 150 are external valve body lights, such as a light-emitting diode (LED) array, that can be visually observed by personnel near the valve. In the form of lights, the indicators 150, 155 could have separate colors, such as red and green, to represent different indications regarding the valve. Alternatively, more elaborate indicators such as a liquid crystal display or other visual indicator could be used.

Figure 2:
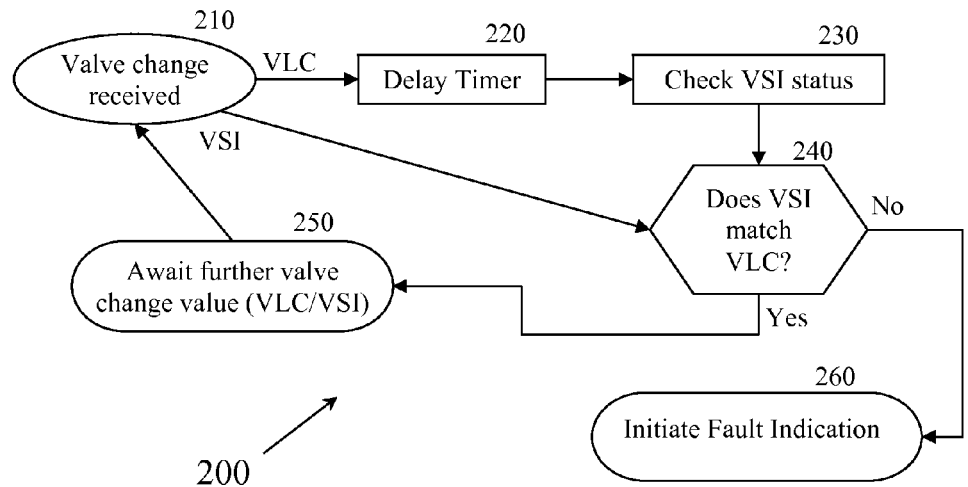
FIG. 2 shows a flow-chart method of initiating a fault indication in accordance with an aspect of the disclosed technologies.

FIG. 2 illustrates a flow-chart method in accordance with an aspect of the disclosed technologies. The method 200 receives input at 210 regarding a change relating to the valve. The valve sensors can indicate a change in the form of the VSI. Also, the command processor can indicate a valve command change in the form of the VLC.

In one aspect of the disclosed technologies the command processor 130 will transmit a signal to the logic processor 110 when there has been a change indicated for the valve to open or close. As the valve commands are binary (open or close) the change command can be stored in a 1-bit memory latch storage circuit or some other form of memory. If the valve change indication received in 210 represents a new VLC, a delay timer is initiated in 220 for a predesignated delay period. After delay period is over, the logic processor retrieves a current VSI value in 230 so a comparison can be performed in 240. If the valve change indication received in 210 represents a change in the state of the valve (a new VSI—the valve opened or closed), the process need not initiate the delay timer, but rather bypass the delay and proceed directly to compare the VSI and VLC in 240. Alternatively, if the delay timer had been initiated but was not finished at the time the new VSI was received, the timer could be allowed to run its course before the comparison is made at 240. The compared values in 240 are said to match if the VSI indicates the valve is in the same state as that which the VLC should have placed the valve. For example, if the VLC was an open command and the current VSI indicates the valve to be open, then the values match. If the two values match, then no fault needs to be indicated and the system can await a further indication of a valve change (in the form of a VLC or VSI) in 250. Once a new valve change is received, the process can proceed again at 210. In 240 if the two values (VSI and VLC) do not match then the process proceeds to 260 where a fault indication is initiated. It should be noted that cutting off the power to the valve can be not only a safety precaution, but also a fault indication.

The type of valve change first received at 210 can also indicate what type of fault has occurred, if a fault is detected from the comparison in 240. For example, should the received valve change in 210 be a new VLC this could represent either a "Failure to Open" or "Failure to Close" condition. Alternatively, should the received valve change in 210 be a new VSI this could represent a mechanical override of either a last open or close command entered for the valve; either a "Mechanical Open" or "Mechanical Close" condition. Thus, the various conditions associated with an indicated type of fault include:

a) the received VLC is an Open command and the VSI, after the delay period, indicates the valve remains closed; this is referred to as a "Failure to Open" condition;

b) the received VLC is a Close command and the VSI, after the delay period, indicates the valve remains open; this is referred to as a "Failure to Close" condition;

c) the received VSI indicates the valve is Open, yet no delay timer was initiated and the VLC is a Close command; this is referred to as a "Mechanical Open" condition and can represent the valve has been manually opened overriding the VLC; and d) the received VSI indicates the valve is Closed, yet no delay timer was initiated and the VLC is an Open command; this is referred to as a "Mechanical Close" condition and can represent the valve has been manually closed overriding the VLC.

The received input at 210 can be initiated in various ways. For example, the logic processor 110 can be passive, in that it awaits input relating to the VSI or the VLC; or it can periodically query and thereby check the status of the VSI or the VLC. In one aspect of the disclosed technologies the valve sensor 120 and the command processor 130 will transmit a signal to the logic processor 110 when there has been a change in the respective signals. In this way if the sensors detect a change of state in the valve, a change in VSI signal will be transmitted. Also, if a new command is entered into the command processor 130 a change in VLC signal will be transmitted. Thus, when a change of either VSI 120 or VLC 130 is received, the method 200 will proceed at 210.

As the command processor 110 receives values from the VSI 120 or the command processor 130, those values can be stored for the comparison made in 240. In this way, when a new value for either the VSI or the VLC is received, it can be compared in 240 to the last value received for the other. The storage can be in the form of a 1-bit memory latch storage circuit that stores the last value for either the VSI or the VLC. Thus, when an OPEN or CLOSE command is sent to the valve, it is stored in the one-bit memory latch while the time delay passes. During this timing period no action is take by the fault detect circuitry.

Figure 3:
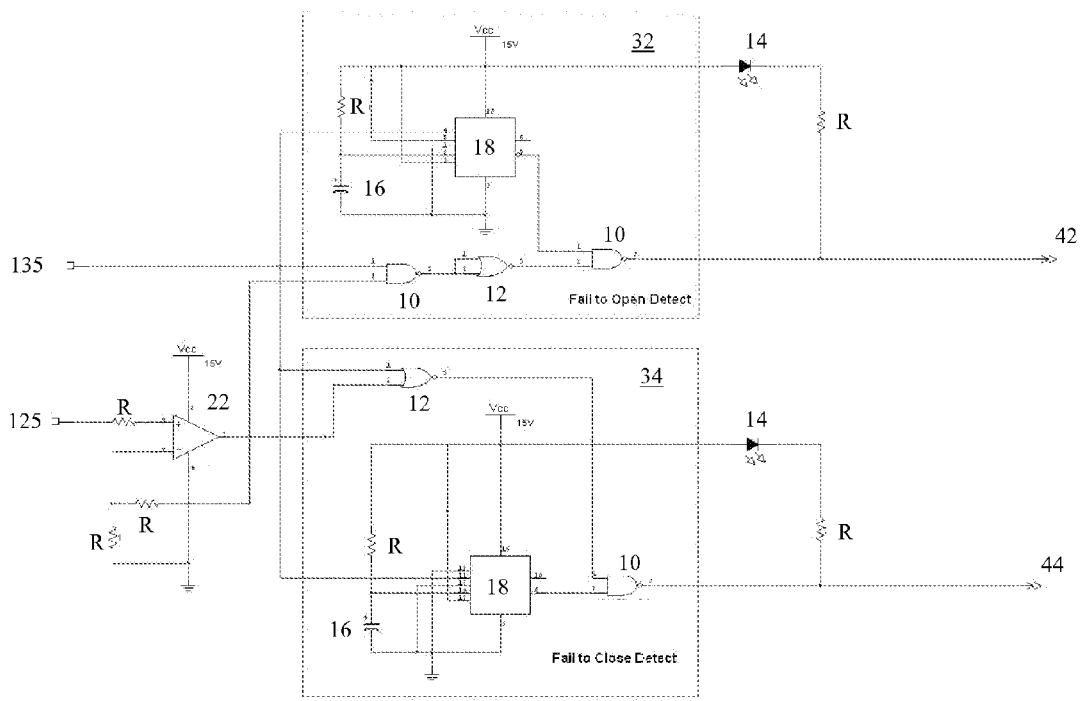
FIG. 3 depicts an exemplary circuit diagram in accordance with an aspect of the disclosed technologies.

The delay period of the delay timer 220 is preferably a one-minute timer, which gives the valve some time to achieve the open or closed state that corresponds to the new VLC. A separate monostable integrated circuit can be used to develop this 1 minute delay for either the OPEN or CLOSE command. It should be understood that the delay can be shorter or longer than one minute, and can alternatively be an adjustable timer (either programmable or mechanically adjustable). In this way, the delay can be customized to the particular valve. FIG. 3 shows an example in the Fail to Open Detect path for the illustrated circuit, where a series of NAND 10 and NOR 12 logic gates are used to achieve this type of timer delay within the circuit.

After the delay timer period the digital circuitry in 230 acquires or checks the VSI status. For example, with reference to FIG. 3, this can involve comparing the state of the 1-bit memory latch 135 that holds the value for the VLC to the state of the position indicator flag 125 that holds the value of the VSI. This action ensures the last command sent to the valve matches the most recent state indication for the valve. When these two states are not the same a fault condition exists and the method will proceed to indicate that fault at 260. A fault indication can be initiated immediately upon detection of a change in the VSI without waiting for the delay timer, which only gets started upon receipt of a new VLC. Regardless of which new value is received (VSI/VLC), if there is a match at 240 the method will proceed to 250, where the system awaits a further new value. However, if the latest comparison reveals a match but a fault is currently being indicated, step 250 can include steps to remove or terminate the current fault indication. Thus, the fault indication can subsequently be terminated upon detection of a change in the fluid valve operative position. This can happen when at the end of the timer period or some time after the two values 125, 135 did not match, thus a fault is indicated, but later a new VSI signal is generated that indicates the fault has been resolved.

The present system can use a combination of analog and digital circuitry to implement its fault detection function. Exemplary embodiment of this aspect are shown in the fault detection and indication circuitry schematically shown in FIGS. 3 and 4. FIG. 3 shows two circuit path alternatives in accordance with aspects of the disclosed technologies. The Fail to Open Detect path 32 illustrates how upon receipt of a new VLC from the command latch 135, the circuit path follows through a series of NAND 10 and NOR 12 logic gates before comparing the command latch 135 value with the indicator position flag 125 value passed through amplifier 22. The process is controlled by a monostable integrated circuit 18, as well as a combination of capacitors 16, resistors R and one or more light emitting diodes 14. Preferably, the light emitting diodes 14 are lit only when a fault has occurred. These small lights can be located on the circuit card to visually indicate an error condition directly at the circuit card location. If there is a mismatch between the command latch 135 and the indicator position flag 125, representing a Failure to Open condition, then a Failure to Open indicator 42 will be transmitted. Otherwise, if there is a match, no fault indication need be transmitted unless conditions later change. The Fail to Close Detect path 34 illustrates how upon receipt of a new VSI from the indicator position flag 125, the circuit path similarly follows through NAND 10 and NOR 12 logic gates to comparing the VLC from the command latch 135 with the new indicator position flag 125 from amplifier 22. The process also includes the monostable integrated circuit 18, capacitors 16, resistors R and one or more light emitting diodes 14. If there is a mismatch between the command latch 135 and the indicator position flag 125, representing a Failure to Close condition, then a Failure to Close indicator 44 will be transmitted. Otherwise, once again if there is a match no fault indication need be transmitted.

An aspect of the disclosed technologies initiates the delay timer upon receipt of a new VLC but not a new VSI. In this way, any time after the predetermined delay period, if a new indicator position flag 125 value is detected within the logic processor 110, either the current fault indication can be terminated or a fault indication can be initiated if it is not already initiated. The earlier case, where a fault is currently indicated but a new indicator position flag 125 is received could represent a longer than usual delay on the part of the fluid valve in changing state in response to the most recent command. Thus, after the delay period runs out, the system would detect a fault, but some time later the fault condition would no longer exist. An alternative system could remove the main fault indication but maintain some type of other indication, such as a warning, regarding the longer than usual delay. As yet a further alternative, a longer than usual delay can be indicated by an actual time count of the duration of the actual delay or only the extended portion of the delay. The later case where no fault indication is currently initiated could represent a mechanical override, such as a Mechanical Open or a Mechanical Close condition. Mechanical Open/Close conditions can be associated with operator over-rides, such as when adjustments or alignments are being made to the valve. Thus as in the earlier case, there is no need to initiate the delay timer as fault detection and/or initiation can commence immediately.

The methods described herein can proceed in different ways, based not only on the type of fault, but also on the particular system settings. Through the use of adjustable switches or a programmable processor, the system can be customized for how faults will be indicated. Circuits or systems, whether local or remote to the valve, can be set or programmed to respond as desired to a detected fault. The system will detect both an electrical and mechanical fault conditions as described above and then indicate the fault at specified locations. It can thus alert personnel by transmitting signals to the operator controls 140 located in a separate area from the valve body, to the valve body LEDs 150 and/or the valve circuit LEDs 155. Also, the system can remove the risk of overheating or a fire hazard by providing an automatic shutdown feature.

Additionally, the system can vary the way a fault is indicated at the various locations. For example, the system can indicate a fault by:

(1) illuminating the valve circuit LEDs 155 for a fault condition;

(2) simultaneously flashing red and green valve body LEDs 150; and (3) simultaneously cycling on and off the voltage to the open/close indicators for the Operator Controls 140. Additionally, specific information regarding the exact fault conditions could be made available at any of the those locations.

An alternative method for signaling not only that there is a fault, but providing information regarding the type of fault can be performed even with just two LEDs at any individual indication location (on the valve circuit, the valve body or the remote operator controls). For example, at any location consider there being only one red and one green LED, which are also used to indicate whether the valve is open or closed. Red can be designated to indicate the valve is closed, while green is designated to indicate the valve is open. Thus, a steady light-on for a single one of either the red or green LEDs indicates the valve is closed or open, respectively. If only one of the two LEDs is on with a steady light, then no fault is indicated. In contrast for one set of fault conditions, such as Failure to Open or Failure to Close, the actual condition of the valve (i.e., closed or open) can still be indicated by the steady-on light (still red for closed or green for open), but the other light can be made to flash. Thus, a Failure to Open would be represented by a steady red light and a flashing green light. Similarly, a Failure to Close would be represented by a steady green light and a flashing red light. In further contrast, for another set of fault conditions, such as Mechanical Open or Mechanical Close, the actual condition of the valve is combined with fault indication by flashing only the LED representing the actual condition. Thus, a lone flashing green light represents a Mechanical Open valve and separately a lone flashing red light represents a Mechanical Close valve. It should be understood that further more basic alternatives could be designed, such as both red and green lights flashing to represent both Failure to Close and Failure to Open; or both red and green lights steady-on to represent both Mechanical Open and Mechanical Close (the lights thus providing less specific fault indications).

Figure 4:
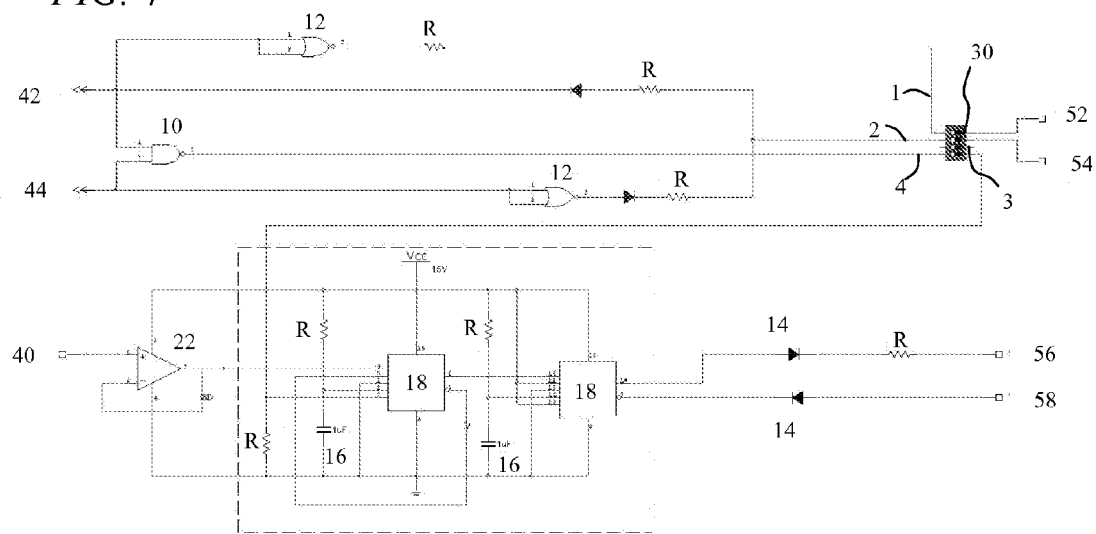
FIG. 4 depicts another exemplary circuit diagram in accordance with another aspect of the disclosed technologies.

It is also advantageous to provide easy or simple customization for the system. One embodiment of this aspect of the disclosed technologies uses a signal steering circuit, as shown in FIG. 4. The circuit can be interposed or synched-in to any output signal 40, in order to alter fault indicators 42, 44. The dip switch 30, in combination with further resistors R, diodes and logic gates 10, 12 can be used to adjust how particular fault indication locations, such as the valve circuit, react to a fault. The dip switch is a set of tiny toggle switches that can be mounted directly on circuit board, such as the valve circuit. For this embodiment, consider the dip switch 30 used to control fault indications in a solenoid valve. When switch 1 of the dip switch 30 is in the up position (switch closed for shut down mode 52), the circuit will shutdown power to the coil of the solenoid valve. Switch 1 in the down position maintains power to the solenoid valve when a fault is indicated. When switch 2 is in the up position (switch closed for the dual indicator mode 54) then the remote indicators (operator controls 140) and local indicators (LEDs 150, 155) will both be illuminated. Switch 2 in the down position means no error is indicated by the lights. When switch 4 is in the up position (switch closed) then the remote and local indicators 140, 150, 155, illuminated by switch 2, will be made to simultaneously flash. Switch 4 in the down position does not change the indicators if error indication is selected on Switch 2. The area of the circuit within the dashed-lines in FIG. 4 represents an optional 2 Hz blink oscillator circuit that uses dual-monostable integrated circuits 18 and is connected to the amplifier 22, in combination with other circuit elements, in response to a Comp_Low 56 or Comp_High 58 signal. Comp_Low 56 and Comp_High 58 signals can be generated by the output of a 2 Hz blink oscillator that provides signals to the basic value control circuitry representing either a valve open or valve closed condition. Such conditions can be associated with a particular signal, such as a green light for open and a red light for closed. Preferably, the Comp_Low 56 and Comp_High 58 signals are complimentary voltage levels, such that green and red indicators lights can be flashed on and off at a rate of 2 Hz.

The dip switch 30 selections can be set in any combination of fault action desired. Switch 3 of dip switch 30 is illustrated as not being used. In one embodiment of the disclosed technologies, the default selections for the dip switch 30 includes individual switches 1, 2 and 4 to be closed. With these default selections, in the case of a system fault, after the time out delay period, the system will remove all power to the solenoid coil and signal a fault to the remote and local indicators 140, 150, 155 with flashing lights.

The valve Fault mode can remain engaged until power to the valve is cycled OFF then ON again or the opposite external command is sent to the valve. For instance if the Valve does not respond to an OPEN command and enters into a fault state, the state can be cleared by cycling the power to the valve Off and On again or by sending a CLOSE command to the valve.

It should be understood that the methods, systems, functions, steps and calculations described herein can be implemented in hardware, software, or a combination of hardware and software. They may be implemented by any type of computer system, processor or other apparatus adapted for carrying out the methods described herein. A typical combination of hardware and software could be a general-purpose computer system with a computer program that, when loaded and executed, controls the computer system such that it carries out the methods described herein. Alternatively, a specific use computer or a suitable integrated circuit, containing specialized hardware for carrying out one or more of the functional tasks of the disclosed technology could be utilized. In a further embodiment, part of all of the disclosed technology could be implemented in a distributed manner, e.g., over a network such as the Internet or a more private or secure network.

Aspects of the presently disclosed technology can also be embedded in a computer program product or computer-readable storage medium, which comprises all the features enabling the implementation of the methods and functions described herein, and which—when loaded in a computer system or processor—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The term computer readable storage medium is any data storage device that can store data, which can thereafter be read by a computer system or processor. Examples of the computer readable storage medium include read-only memory, random-access memory, CD-ROMs, DVDs, magnetic tape, optical data storage devices, and carrier waves. The computer readable storage medium can also be distributed over network-coupled processors or computer systems so that the computer readable code is stored and executed in a distributed fashion.

It will be appreciated that various of the above-disclosed and other features and functions, or alternatives thereof, may be desirably combined into many other different systems or applications. It will also be appreciated that various presently unforeseen or unanticipated alternatives, modifications, variations, or improvements therein may be subsequently made by those skilled in the art which are also intended to be encompassed by the disclosed embodiments and the following claims.

What is claimed is:

1. A method of indicating a fault associated with a fluid valve moveable between an open and a closed operative position, the method comprising:
receiving a valve change indication in a logic processor;
initiating a delay timer to generate a predetermined time delay if the valve change indication is a change in a valve last command received from a valve command processor;
bypassing the delay timer if the valve change indication is a change in a valve state indicator received from a valve sensor;
comparing a mostly recently received valve state indicator to a most recently received valve last command, said comparison being done after the predetermined time delay generated by the valve timer if the valve change indication is a change in a valve last command received from a valve command processor, wherein the valve state indicator represents a detected operative position of the valve, the valve last command being an operative command sent to the fluid valve; and
cutting off power to the fluid valve when the mostly recently received valve state indicator does not match the mostly recently received valve last command.

2. The method of claim 1, wherein the valve last command is a most recent operative command sent to the fluid valve.

3. The method of claim 1, wherein the predetermined time delay is at least one minute in duration.

4. The method of claim 1, wherein the predetermined time delay is adjustable.

5. The method of claim 1, further comprising initiating a fault indication when the mostly recently received valve state indicator does not match the mostly recently received valve last command, wherein the fault indication includes initiating a visual signal identifying the type of fault that has occurred.

6. The method of claim 1, wherein the fluid valve is a solenoid operating valve and power is cut off to at least a portion of the solenoid operating valve.

7. The method of claim 5, wherein the fault indication is transmitted to an indicator on at least one of a valve circuit in the valve, a portion of the valve body and a remote location to the valve.

8. The method of claim 7, wherein the fault indication is transmitted to all three of the valve circuit, valve body and remote location.

9. The method of claim 5, wherein the fault indication identifies a failure to open, failure to close, mechanical open or mechanical close fault associated with the valve.

10. A fluid valve fault indication system, the system comprising:
a valve sensor for detecting at least one of an open operative position and a closed operative position of a fluid valve, the valve sensor generating a valve state indicator; and
a valve command processor for generating a valve last command that identifies a last operative command sent to the fluid valve, the last operative command including an open or a close command; and
a logic processor for receiving the valve state indicator from the valve sensor and the valve last command from the valve command processor, the logic processor determining a valve change indication based on the received valve state indicator and the received valve last command, the logic processor comprising:
a delay timer, wherein the delay timer is activated for generating a predetermined time delay if the valve change indication is a change in a valve last command received from the valve command processor and is not activated if the valve change indication is a change in a valve state indicator received from a valve sensor;
a comparator for comparing a mostly recently received valve state indicator to a most recently received valve last command, said comparison being done after the predetermined time delay generated by the delay timer if the valve change indication is a change in a valve last command received from a valve command processor; and
a fault indication controller operatively coupled to the logic processor, the fault indication controller cutting off power to the fluid valve when the mostly recently received valve state indicator does not match the mostly recently received valve last command.

11. A system according to claim 10, wherein the valve last command is a most recent operative command sent to the fluid valve.

12. A system according to claim 10, wherein the predetermined time delay is approximately one minute in duration.

13. A system according to claim 10, wherein the fault indication controller further initiates a fault indication when the mostly recently received valve state indicator does not match the mostly recently received valve last command, the fault indication includes initiating a visual signal identifying the type of fault that has occurred.

14. A system according to claim 13, wherein the fault indication is initiated immediately upon detection of a change in the fluid valve operative position.

15. A system according to claim 13, wherein the fault indication is subsequently terminated upon detection of a change in the fluid valve operative position.

16. A system according to claim 13, wherein the fault indication is transmitted to an indicator on at least one of a valve circuit in the valve, a portion of the valve body and a remote location to the valve.

17. A system according to claim 16, wherein the fault indication is transmitted to all three of the valve circuit, valve body and remote location.

18. A system according to claim 13, wherein the fault indication identifies a failure to open, failure to close, mechanical open or mechanical close fault associated with the valve.

* * * * *